(12) United States Patent
Nguyen et al.

(10) Patent No.: US 12,505,888 B2
(45) Date of Patent: Dec. 23, 2025

(54) MEMORY DEVICE PRODUCING METADATA CHARACTERIZING APPLIED READ VOLTAGE LEVEL WITH RESPECT TO VOLTAGE DISTRIBUTIONS

(71) Applicant: Micron Technology, Inc., Boise, ID (US)

(72) Inventors: Dung Viet Nguyen, San Jose, CA (US); Patrick R. Khayat, San Diego, CA (US); Sivagnanam Parthasarathy, Carlsbad, CA (US); Zhengang Chen, San Jose, CA (US); Dheeraj Srinivasan, San Jose, CA (US)

(73) Assignee: Micron Technology Inc., Boise, ID (US)

( * ) Notice: Subject to any disclaimer, the term of this patent is extended or adjusted under 35 U.S.C. 154(b) by 123 days.

(21) Appl. No.: 18/228,291

(22) Filed: Jul. 31, 2023

(65) Prior Publication Data
US 2024/0071521 A1 Feb. 29, 2024

Related U.S. Application Data

(60) Provisional application No. 63/402,622, filed on Aug. 31, 2022.

(51) Int. Cl.
*G11C 7/00* (2006.01)
*G11C 16/26* (2006.01)
*G11C 16/32* (2006.01)
*G11C 29/52* (2006.01)

(52) U.S. Cl.
CPC .............. *G11C 16/26* (2013.01); *G11C 16/32* (2013.01); *G11C 29/52* (2013.01)

(58) Field of Classification Search
CPC ....... G11C 7/1051; G11C 7/22; G11C 7/1072; G11C 7/1006; G11C 7/1066
USPC ...................................... 365/189.15
See application file for complete search history.

(56) References Cited

U.S. PATENT DOCUMENTS

| | | | | |
|---|---|---|---|---|
| 10,163,500 | B1 * | 12/2018 | Yu ........................ | G06F 11/1072 |
| 2014/0010026 | A1 * | 1/2014 | Kim ........................ | G11C 7/00 365/189.07 |
| 2018/0189135 | A1 * | 7/2018 | Naik .................... | G11C 29/028 |

* cited by examiner

*Primary Examiner* — Son T Dinh
(74) *Attorney, Agent, or Firm* — LOWENSTEIN SANDLER LLP

(57) ABSTRACT

Described are memory devices producing metadata characterizing the applied read voltage level with respect to voltage distributions. An example memory sub-system comprises: a memory device comprising a plurality of memory cells; and a controller coupled to the memory device, the controller to perform operations comprising: performing, using a read voltage level, a read strobe with respect to a subset of the plurality of memory cells; and receiving, from the memory device, one or more metadata values characterizing the read voltage level with respect to threshold voltage distributions of the subset of the plurality of memory cells, wherein the one or more metadata values reflect a conductive state of one or more bitlines connected to the subset of the plurality of memory cells.

17 Claims, 11 Drawing Sheets

MEMORY DEVICE PRODUCING METADATA CHARACTERIZING APPLIED READ VOLTAGE LEVEL WITH RESPECT TO VOLTAGE DISTRIBUTIONS

REFERENCE TO RELATED APPLICATIONS

This application claims the benefit of U.S. Provisional Application No. 63/402,622, filed Aug. 31, 2022, which is incorporated by reference herein.

TECHNICAL FIELD

Embodiments of the disclosure relate generally to memory sub-systems, and more specifically, to memory devices producing metadata characterizing the applied read voltage level with respect to voltage distributions.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
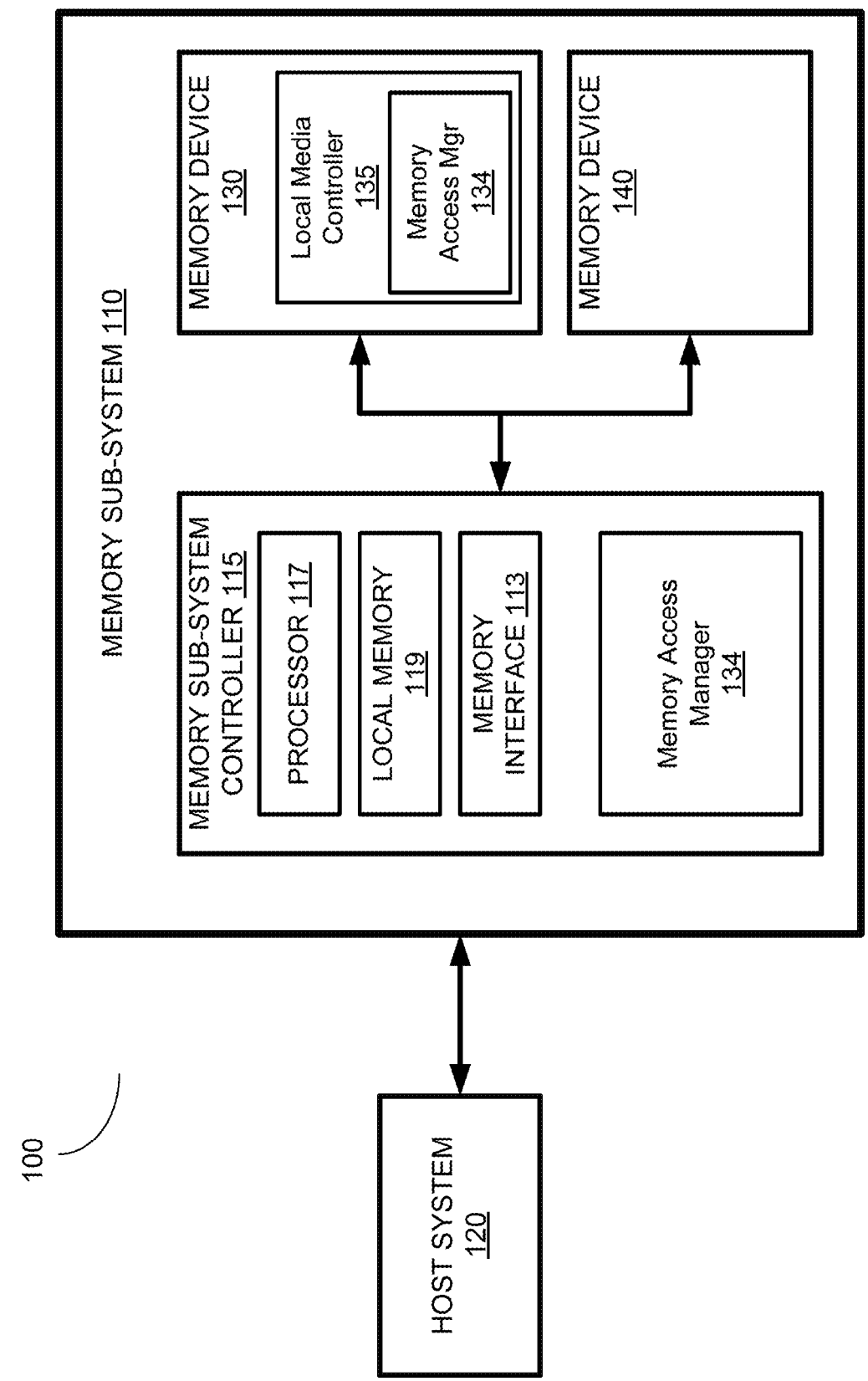
FIG. 1 illustrates an example computing system that includes a memory sub-system in accordance with some implementations of the present disclosure.

Aspects of the present disclosure are directed to memory devices producing metadata characterizing the applied read voltage level with respect to voltage distributions of target memory cells.

One or more memory devices can be a part of a memory sub-system, which can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can include two or more planes. For some types of non-volatile memory devices (e.g., NAND devices), each plane includes of a set of physical blocks. In some implementations, each block can include multiple sub-blocks. Each plane carries a matrix of memory cells formed onto a silicon wafer and joined by conductors referred to as wordlines and bitlines, such that a wordline joins multiple memory cells forming a row of the matric of memory cells, while a bitline joins multiple memory cells forming a column of the matric of memory cells.

Depending on the cell type, each memory cell can store one or more bits of binary information, and has various logic states that correlate to the number of bits being stored. The logic states can be represented by binary values, such as "0" and "1", or combinations of such values. A memory cell can be programmed (written to) by applying a certain voltage to the memory cell, which results in an electric charge being held by the memory cell, thus allowing modulation of the voltage distributions produced by the memory cell. A set of memory cells referred to as a memory page can be programmed together in a single operation, e.g., by selecting consecutive bitlines.

Precisely controlling the amount of the electric charge stored by the memory cell allows establishing multiple logical levels, thus effectively allowing a single memory cell to store multiple bits of information. A read operation can be performed by comparing the measured threshold voltages ($V_t$) exhibited by the memory cell to one or more reference voltage levels in order to distinguish between two logical levels for single-level cell (SLCs) and between multiple logical levels for multi-level cells. In various embodiments, a memory device can include multiple portions, including, e.g., one or more portions where the sub-blocks are configured as SLC memory and one or more portions where the sub-blocks are configured as multi-level cell (MLC) memory that can store three bits of information per cell and/or (triple-level cell) TLC memory that can store three bits of information per cell. The voltage levels of the memory cells in TLC memory form a set of 8 programming distributions representing the 8 different combinations of the three bits stored in each memory cell. Depending on how they are configured, each physical page in one of the sub-blocks can include multiple page types. For example, a physical page formed from single level cells (SLCs) has a single page type referred to as a lower logical page (LP). Multi-level cell (MLC) physical page types can include LPs and upper logical pages (UPs), TLC physical page types are LPs, UPs, and extra logical pages (XPs), and quad level cells (QLC) physical page types are LPs, UPs, XPs and top logical pages (TPs). For example, a physical page formed from memory cells of the QLC memory type can have a total of four logical pages, where each logical page can store data distinct from the data stored in the other logical pages associated with that physical page.

A memory device typically experiences random workloads and operating conditions, which can impact the threshold voltage distributions causing them to shift to higher or lower values. In order to compensate for various voltage distribution shifts, calibration operations can be performed in order to adjust the read levels. In some implementations, the adjustment can be performed based on values of one or more data state metrics obtained from a sequence of read and/or write operations. In an illustrative example, the data state metric can be represented by a raw bit error rate (RBER), which is the ratio of the number of erroneous bits to the number of all data bits stored in a certain portion of the memory device (e.g., in a specified data block). In another illustrative example, the data state metric can be represented by a bit error count (BEC). In some implementations, sweep reads can be performed in order to create RBER/log likelihood ratio (LLR) profiles to error correction coding (ECC) and select the most efficient profile. However, these and other calibration techniques can exhibit pure accuracy and/or high latency. Furthermore, RBER estimation techniques can be effectively "blind" with respect to the voltage distribution, which means that the threshold voltage estimate produced by such calibration techniques could gradually drift into the wrong voltage distribution valley, thus making the read data uncorrectable.

Implementations of the present disclosure address the above-referenced and other deficiencies of various common techniques by utilizing memory device-originated metadata characterizing the applied read voltage level with respect to the voltage distributions. In some implementations, a memory device may, upon performing a read strobe, return one or more metadada values that characterize the applied read voltage level with respect to the threshold voltage distributions of memory cells of the specified memory page. "Read strobe" herein refers to an act of applying a read voltage level to a chosen wordline thus identifying the memory cells having their respective threshold voltages below and/or above the applied read level. A read operation can include one or more read strobes.

In some implementations, the metadata returned by the memory device along with the sensed data may reflect the conductive state of a subset of bitlines that are connected to memory cells forming at least a portion of the specified memory page. In an illustrative example, the metadata values can include the failed byte count (CFByte), which reflects (i.e., is equal to or is derived by a known transformation from) the number of bytes in the sensed data that have at least one non-conducting bitline. In another illustrative example, the metadata values can include the failed bit count (CFBit), which reflects (i.e., is equal to or is derived by a known transformation from) the number of non-conducting bitlines in the sensed data.

The metadata values can be generated for a whole memory page or only for a portion of the memory page (in order to reduce latency). In some implementations, the physical boundary of the portion of memory page for which the metadata is obtained is configurable.

The memory device-originated metadata characterizing the applied read voltage level with respect to the voltage distributions can be utilized by the memory sub-system controller or a local media controller ("the controller") for adjusting the read voltage level in a manner that would minimize the read operation latency while providing at least a specified accuracy (e.g., a chosen error metric not exceeding a threshold value) of the read operation. Alternatively, the controller can utilize the memory device-originated metadata characterizing voltage distributions for adjusting the read voltage level in a manner that would maximize the read operation accuracy while not exceeding a specified latency of the read operation.

In some implementations, after performing each read strobe, the controller can decode the sensed data. If the decoding operation fails, the controller utilizes the returned metadata values (e.g., failed byte count and/or failed bit count) for determining the read voltage adjustment for performing subsequent read strobes with respect to the wordline to which the initial read strobe has been applied and/or to one or more neighboring wordlines of that wordline. This sequence of calibration and read operations can be iteratively performed until either the sensed data is successfully decoded (in which case no further action is needed) or a predefined maximum number of iterations have been performed. Alternatively, the method can stop if it determines that the optimum read strobe, i.e., the valley bottom, is found.

In an illustrative example, the controller can perform a read strobe and adjust the read voltage level based on the failed byte count for the highest logical programming level. Should a read strobe using the next read voltage level produce an undecodable value, the controller can perform another read strobe and adjust the read voltage level based on the failed bit count for at least a subset of logical programming levels. This sequence of calibration and read operations can be iteratively performed until either the sensed data is successfully decoded or a predefined maximum number of iterations have been performed, as described in more detail herein below.

Thus, embodiments of the present disclosure improve the accuracy and efficiency of read level calibration operations. In various embodiments, the read level calibration can be performed by the media controller residing on the memory device or by the memory sub-system controller. Furthermore, the read level calibration performed in accordance with aspects of the present disclosure significantly improves the bit error rate, by tracking the voltage threshold shift caused by slow charge loss and/or temperature as well as compensating for the program and read disturb and/or physical defects of the storage media, as described in more detail herein below.

While the examples described herein involve triple level cell (TLC) voltage distributions, in various other implementations, similar techniques can be implemented for memory pages storing other numbers of bits per cell.

FIG. 1 illustrates an example computing system 100 that includes a memory sub-system 110 in accordance with some implementations of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some implementations, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some implementations, each of the memory devices 130 can include one or more arrays of memory cells such as SLCs, MLCs, TLCs, QLCs, or any combination of such. In some implementations, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some implementations, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some implementations, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some implementations, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some implementations, memory sub-system 110 is a managed memory device, which includes a raw memory device 130 having control logic (e.g., local media controller 135) on the die and a controller (e.g., memory sub-system controller 115) for media management within the same memory device package. An example of a managed memory device is a managed NAND (MNAND) device.

In one embodiment, the memory sub-system 110 includes a memory interface component 113. Memory interface component 113 is responsible for handling interactions of memory sub-system controller 115 with the memory devices of memory sub-system 110, such as memory device 130. For example, memory interface component 113 can send memory access commands corresponding to requests received from host system 120 to memory device 130, such as program commands, read commands, or other commands. In addition, memory interface component 113 can receive data from memory device 130, such as data retrieved in response to a read command or a confirmation that a program command was successfully performed. For example, the memory sub-system controller 115 can include a processor 117 (processing device) configured to execute instructions stored in local memory 119 for performing the operations described herein.

In one embodiment, memory device 130 includes a memory access manager 134 configured to carry out memory access operations, e.g., in response to receiving memory access commands from memory interface 113. In some implementations, local media controller 135 includes at least a portion of memory access manager 134 and is configured to perform the functionality described herein. In some implementations, memory access manager 134 is implemented on memory device 130 using firmware, hardware components, or a combination of the above. In an illustrative example, memory access manager 134 receives, from a requestor, such as memory interface 113, a request to read a data page of the memory device 130. A read operation can include a series of read strobes, such that each strobe applied a certain read voltage level to a chosen wordline of a memory device 130 in order to compare the estimated threshold voltages $V_T$ of a set of memory cells to one or more read levels corresponding to the expected positions of the voltage distributions of the memory cells.

The memory device 130 can be configured to return, in response to a read strobe, one or more metadata values to the memory access manager 134. In an illustrative example, the memory device may, upon performing a read strobe, return the failed byte count (CFByte). The failed byte count reflects (i.e., is equal to or is derived by a known transformation from) the number of bytes in the sensed data that have at least one non-conducting bitline. In another illustrative example, the memory device may, upon performing a read strobe, return the failed bit count (CFBit). The failed bit count reflects (i.e., is equal to or is derived by a known transformation from) the number of non-conducting bitlines in the sensed data. In various illustrative examples, the memory device can inspect at least a part of a memory page (e.g., four or eight bitlines) when counting non-conducting bitlines.

A non-conductive bitline identifies a subset of memory cells having their respective threshold voltages above the applied read voltage level. Accordingly, the ratio of the number of cells that have their respective threshold voltages above the applied read voltage level to the total number of cells may be indicative of the position of the applied read voltage level to the bottom of the voltage distribution valley.

The metadata values received from the memory device in response to a read strobe can be used by the memory sub-system controller 115 or a local media controller 135 ("the controller") in order to adjust the applied read levels in order to compensate for the voltage distribution shift.

In some implementations, the controller can utilize one or more returned metadata values to index a data structure (e.g., a lookup table) mapping memory device-originated metadata values (e.g., failed byte counts or failed bit counts) to the read voltage adjustment values. Alternatively, the controller can compute the read voltage adjustment value by applying a predefined mathematical transformation to the memory device-originated metadata values (e.g., failed byte counts or failed bit counts). The controller can then utilize the determined read voltage adjustment value for performing subsequent read operations.

As noted herein above, in some implementations, the controller can utilize the memory device-originated metadata characterizing voltage distributions for adjusting the read voltage level in a manner that would minimize the read operation latency while providing at least a specified accuracy of the read operation. Alternatively, the controller can utilize the memory device-originated metadata characterizing voltage distributions for adjusting the read voltage level in a manner that would maximize the read operation accuracy while not exceeding a specified latency of the read operation.

In some implementations, the controller can perform read level calibration (i.e., adjusting the read voltage levels) as part of a read command flow. After performing each read strobe, the controller can decode the sensed data. If the decoding operation fails, the controller utilizes the returned metadata values (e.g., failed byte count and/or failed bit count) for determining the read voltage adjustment for performing subsequent read operations with respect to the wordline to which the initial read strobe has been applied and/or to one or more neighboring wordlines of that wordline. This sequence of calibration and read operations can be iteratively performed until either the sensed data is successfully decoded or a predefined maximum number of iterations have been performed.

In an illustrative example, the controller can perform a read strobe and adjust the read voltage level based on the failed byte count for the highest logical programming level. Should a read strobe using the next read voltage level produce an undecodable value, the controller can perform another read strobe and adjust the read voltage level based on the failed bit count for at least a subset of logical programming levels. This sequence of calibration and read operations can be iteratively performed until either the sensed data is successfully decoded or a predefined maximum number of iterations have been performed, as described in more detail herein below.

Figure 2:
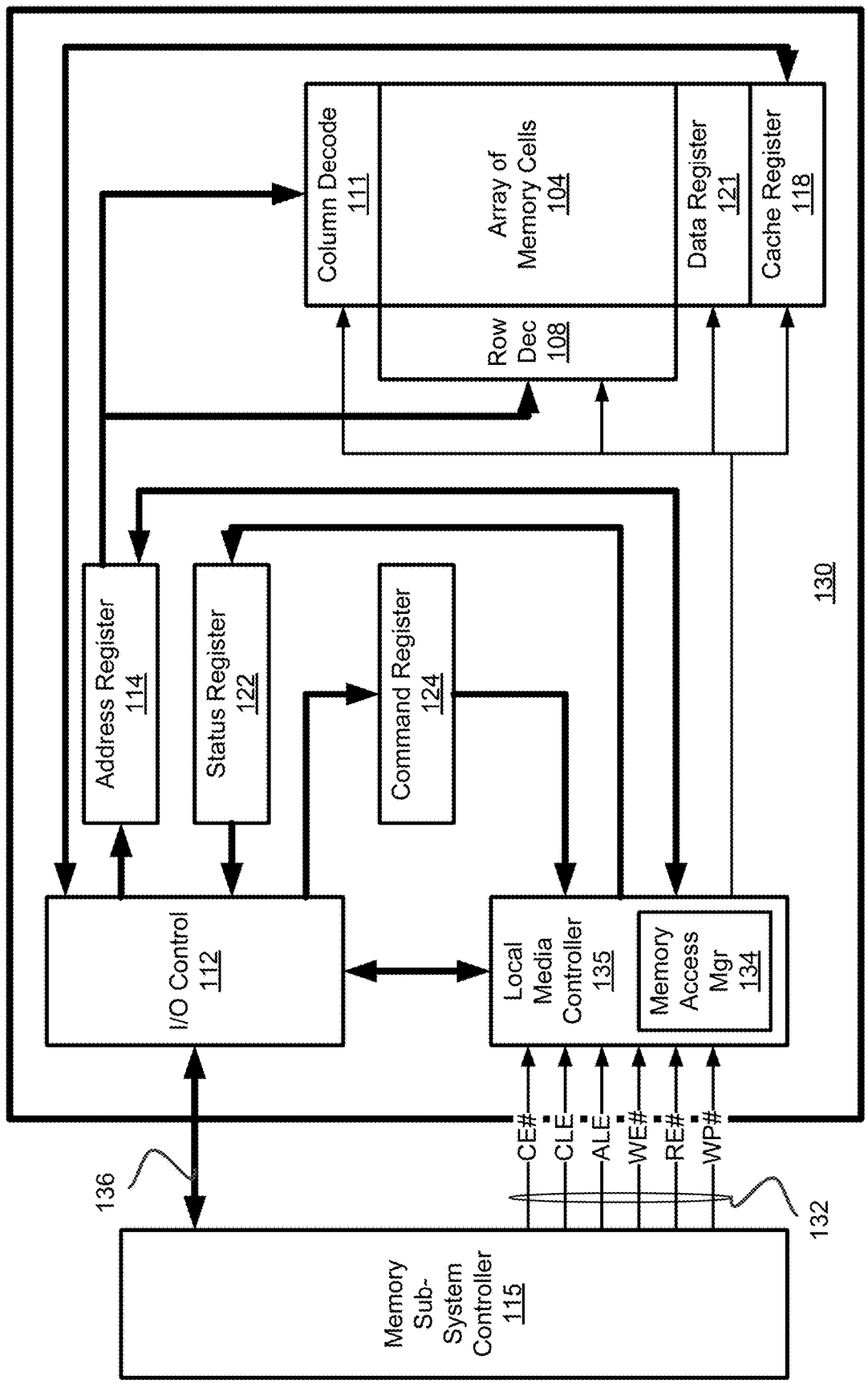
FIG. 2 is a block diagram of a memory device in communication with a memory sub-system controller of a memory sub-system, according to an embodiment.

FIG. 2 is a simplified block diagram of a first apparatus, in the form of a memory device 130, in communication with a second apparatus, in the form of a memory sub-system controller 115 of a memory sub-system (e.g., memory sub-system 110 of FIG. 1), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), can be a memory controller or other external host device.

Memory device 130 includes an array of memory cells 104 logically arranged in rows and columns. Memory cells of a logical row are typically connected to the same access line (e.g., a wordline) while memory cells of a logical column are typically selectively connected to the same data line (e.g., a bit line). A single access line can be associated with more than one logical row of memory cells and a single data line can be associated with more than one logical column. Memory cells (not shown in FIG. 2) of at least a portion of array of memory cells 104 are capable of being programmed to one of at least two target data states.

Row decode circuitry 108 and column decode circuitry 111 are provided to decode address signals. Address signals are received and decoded to access the array of memory cells 204. Memory device 130 also includes input/output (I/O) control circuitry 112 to manage input of commands, addresses and data to the memory device 130 as well as output of data and status information from the memory device 130. An address register 114 is in communication with I/O control circuitry 112 and row decode circuitry 108 and column decode circuitry 111 to latch the address signals prior to decoding. A command register 124 is in communication with I/O control circuitry 112 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 204. The local media controller 135 is in communication with row decode circuitry 108 and column decode circuitry 111 to control the row decode circuitry 108 and column decode circuitry 111 in response to the addresses. In one embodiment, local media controller 135 includes memory access manager 134, which can implement the memory programming operations with respect to memory device 130, as described herein.

The local media controller 135 is also in communication with a cache register 218. Cache register 118 latches data, either incoming or outgoing, as directed by the local media controller 135 to temporarily store data while the array of memory cells 104 is busy writing or reading, respectively, other data. During a programming operation (e.g., a write operation), data can be passed from the cache register 118 to the data register 121 for transfer to the array of memory cells 204; then new data can be latched in the cache register 118 from the I/O control circuitry 212. During a read operation, data can be passed from the cache register 118 to the I/O control circuitry 112 for output to the memory sub-system controller 115; then new data can be passed from the data register 121 to the cache register 218. The cache register 118 and/or the data register 121 can form (e.g., can form a portion of) a page buffer of the memory device 130. A page buffer can further include sensing devices (not shown in FIG. 2) to sense a data state of a memory cell of the array of memory cells 204, e.g., by sensing a state of a data line connected to that memory cell. A status register 122 can be in communication with I/O control circuitry 112 and the local memory controller 135 to latch the status information for output to the memory sub-system controller 115.

Memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) can be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 136 and outputs data to the memory sub-system controller 115 over I/O bus 136.

For example, the commands can be received over input/output (I/O) pins [7:0] of I/O bus 136 at I/O control circuitry 112 and can then be written into command register 224. The addresses can be received over input/output (I/O) pins [7:0] of I/O bus 136 at I/O control circuitry 112 and can then be written into address register 214. The data can be received over input/output (I/O) pins [7:0] for an 8-bit device or input/output (I/O) pins [15:0] for a 16-bit device at I/O control circuitry 112 and then can be written into cache register 218. The data can be subsequently written into data register 121 for programming the array of memory cells 204.

In an embodiment, cache register 118 can be omitted, and the data can be written directly into data register 220. Data can also be output over input/output (I/O) pins [7:0] for an 8-bit device or input/output (I/O) pins [15:0] for a 16-bit device. Although reference can be made to I/O pins, they can include any conductive node providing for electrical connection to the memory device 130 by an external device (e.g., the memory sub-system controller 115), such as conductive pads or conductive bumps as are commonly used.

In some implementations, additional circuitry and signals can be provided, and that the memory device 130 of FIG. 2 has been simplified. It should be recognized that the functionality of the various block components described with reference to FIG. 2 can not necessarily be segregated to distinct components or component portions of an integrated circuit device. For example, a single component or component portion of an integrated circuit device could be adapted to perform the functionality of more than one block component of FIG. 2. Alternatively, one or more components or component portions of an integrated circuit device could be combined to perform the functionality of a single block component of FIG. 2. Additionally, while specific I/O pins are described in accordance with popular conventions for receipt and output of the various signals, it is noted that other combinations or numbers of I/O pins (or other I/O node structures) can be used in the various embodiments.

One or more memory devices of the memory sub-system 100 can be represented, e.g., by NAND memory devices that utilize transistor arrays built on semiconductor chips. As illustrated schematically in FIG. 3A, a memory cell of a memory device can be a transistor, such as metal-oxide-semiconductor field effect transistor (MOSFET), having a source (S) electrode and a drain (D) electrode to pass electric current there through. The source and drain electrodes can be connected to a conductive bitline (BL), which can be shared by multiple memory cells. A memory device can include an array or memory cells that are connected to a plurality of wordlines (WL) and a plurality of bitlines (BL), as schematically illustrated by FIG. 4. A memory device can further include circuitry for selectively coupling WLs and BLs to voltage sources providing control gate and source-drain signals, which is omitted from FIG. 4 for clarity and conciseness.

Referring again to FIG. 3A, memory cells 302 and 304 can be connected to the same bitline N and two different conductive wordlines, M and M+1, respectively. A memory cell can further have a control gate (CG) electrode to receive a voltage signal $V_{CG}$ to control the magnitude of electric current flowing between the source electrode and the drain electrode. More specifically, there can be a threshold control gate voltage $V_T$ (herein also referred to as "threshold voltage" or simply as "threshold") such that for $V_{CG} < V_T$, the source-drain electric current can be low, but can increase substantially once the control gate voltage has exceeded the threshold voltage, $V_{CG} > V_T$. Transistors of the same memory device can be characterized by a distribution of their threshold voltages, $P(V_T) = dW/dV_T$, so that $dW = P(V_T)dV_T$ represents the probability that any given transistor has its threshold voltage within the interval $[V_T, V_T+dV_T]$. For example, FIG. 3B illustrates schematically dependence of the source-drain current $I_{SD}$ on the control gate voltage for two memory cells, e.g. memory cell 302 (solid line) and memory cell 304 (dashed line), having different threshold control gate voltages.

Figure 3A:
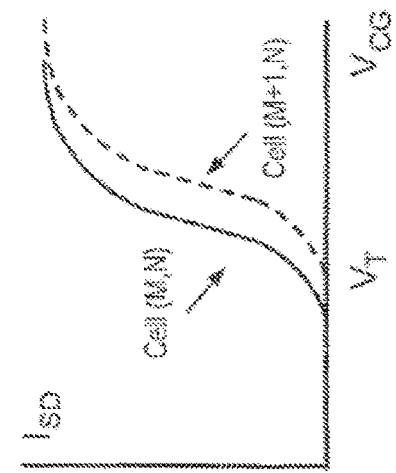
FIG. 3A schematically illustrates a set of memory cells as arranged in a memory device.
Figure 3B:
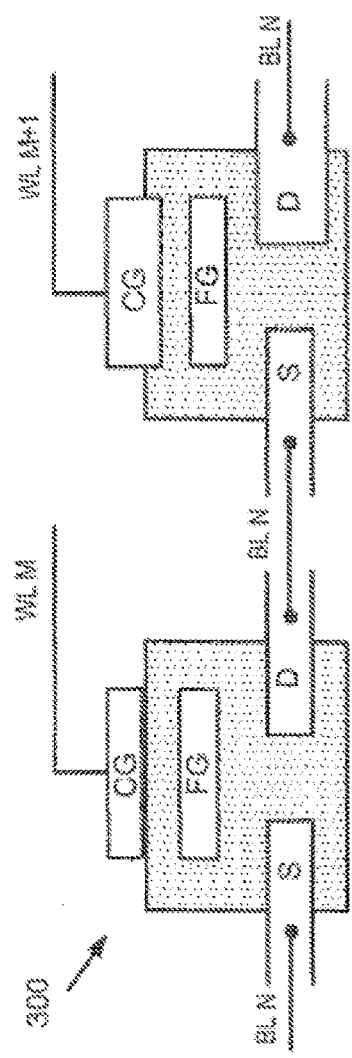
FIG. 3B schematically illustrates schematically dependence of the source-drain current on the control gate voltage for two memory cells.
Figure 4:
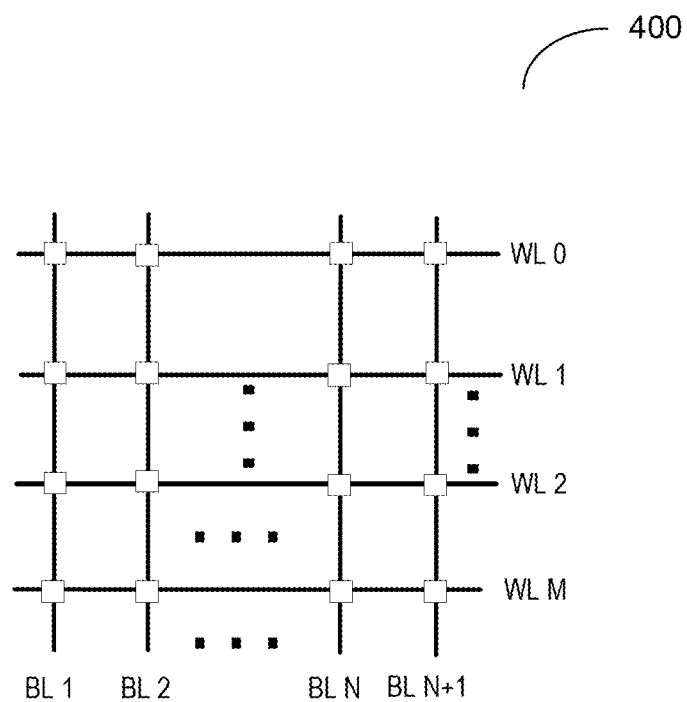
FIG. 4 schematically illustrates an example memory array.

To make a memory cell non-volatile, the cell can be further equipped with a conducting island—a charge storage node—that can be electrically isolated from the control gate, the source electrode, and the drain electrode by insulating layers (depicted in FIG. 3A as the dotted region). In response to an appropriately chosen positive (in relation to the source potential) control gate voltage $V_{CG}$, the charge storage node can receive an electric charge Q, which can be permanently stored thereon even after the power to the memory cell—and, consequently, the source-drain current—is ceased. The charge Q can affect the distribution of threshold voltages $P(V_T, Q)$. Generally, the presence of the electric charge Q shifts the distribution of threshold voltages towards higher voltages, compared with the distribution $P(V_T)$ for an uncharged charge storage node. This happens because a stronger positive control gate voltage $V_{CG}$ can be needed to overcome a negative potential of the charge storage node charge Q. If any charge of a sequence $Q_k$ of charges with $1 \leq k \leq 2^N$ can be selectively programmed (and later detected during a read operation) into a memory cell, the memory cell can function as an N-bit storage unit. The charges $Q_k$ are preferably selected to be sufficiently different from each other, so that any two adjacent voltage distributions $P(V_T, Q_k)$ and $P(V_T, Q_{k+1})$ do not overlap being separated by a valley margin, so that $2^N$ distributions $P(V_T, Q_k)$ are interspaced with $2^N-1$ valley margins.

Figure 3C:
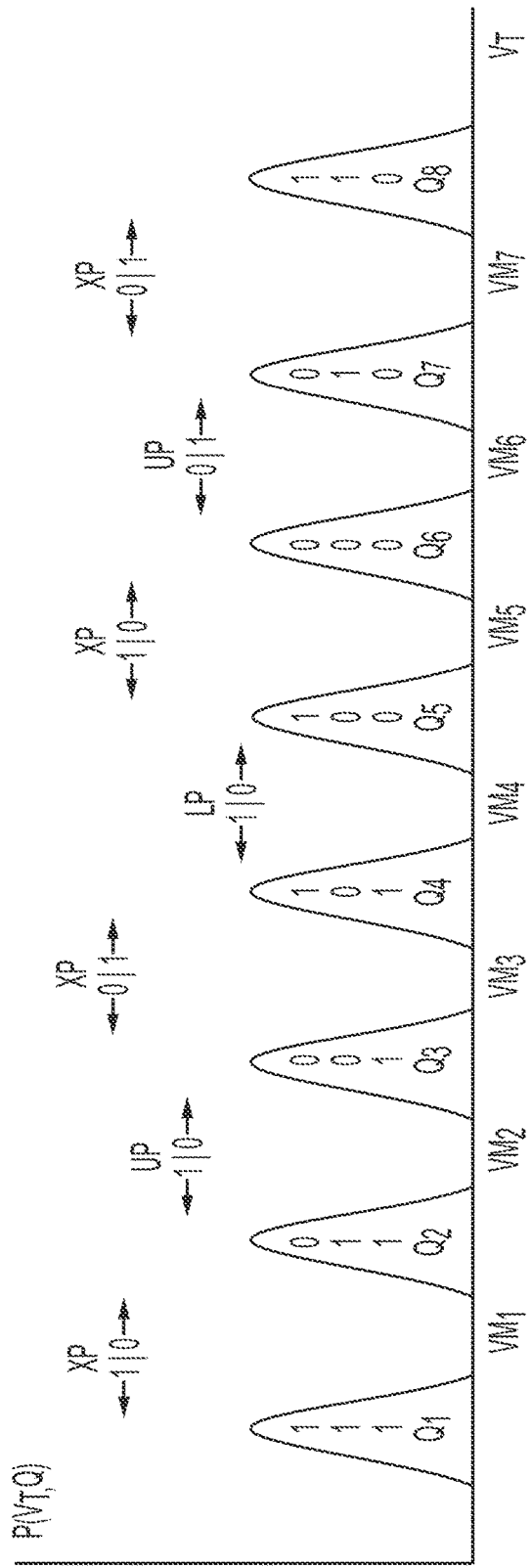
FIG. 3C schematically illustrates an example distribution of threshold control gate voltages for a set of memory cells.

FIG. 3C illustrates schematically a distribution of threshold control gate voltages for a set of memory cells capable of storing three bits of data by programming the memory cell into at least eight charge states that differ by the amount of charge on the cell's charge storage node. FIG. 3C shows distributions of threshold voltages $P(V_T, Q_k)$ for $2^N=8$ different charge states of a tri-level cell (TLC) separated with $2^3-1=7$ valley margins $VM_k$. Accordingly, a memory cell programmed into a charge state k-th (i.e., having the charge $Q_k$ deposited on its charge storage node) can be storing a particular combination of N bits (e.g., 0110, for N=4). This charge state $Q_k$ can be determined during a readout operation by detecting that a control gate voltage $V_{CG}$ within the valley margin $VM_k$ is sufficient to open the cell to the source-drain current whereas a control gate voltage within the preceding valley margin $VM_{k-1}$ is not.

Memory devices can be classified by the number of bits stored by each cell of the memory. For example, a single-level cell (SLC) memory has cells that can each store one bit of data (N=1). A multi-level cell (MLC) memory has cells that can each store up to two bits of data (N=2), a tri-level cell (TLC) memory has cells that can each store up to three bits of data (N=3), and a quad-level cell (QLC) memory has cells that can each store up to four bits of data (N=4). In general, the operations described herein can be applied to memory devices having N-bit memory cells, where N>1.

For example, a TLC can be capable of being in one of eight charging states $Q_k$ (where the first state is an uncharged state $Q_1=0$) whose threshold voltage distributions are separated by valley margins $VM_k$ that can be used to read out the data stored in the memory cells. For example, if it is determined during a read operation that a read threshold voltage falls within a particular valley margin of $2^N-1$ valley margins, it can then be determined that the memory cell is in a particular charge state out of $2^N$ possible charge states. By identifying the right valley margin of the cell, it can be determined what values all of its N bits have. The identifiers of valley margins (such as their coordinates, e.g., location of centers and widths) can be stored in a read level threshold register of the memory controller 215.

As noted herein above, the memory controller 215 can program a state of the memory cell and then read can read this state by comparing a read threshold voltage $V_T$ of the memory cell against one or more read level thresholds. The read operation can be performed after a memory cell is placed in one of its charged states by a previous programming operation, which can include one or more programming passes. Each programming pass would apply appropriate programming voltages to a given wordline in order place appropriate charges on the charge storage nodes of the memory cells that are connected to the wordline.

A programming operation involves a sequence of programming voltage pulses that are applied to a selected (target) wordline (i.e., the wordline that is electrically coupled to the target memory cells). Referring again to FIG. 3A, the source (S) and drain (D) electrodes of a memory cell can be connected to a conductive bitline shared by multiple memory cells. A programming operation would apply a sequence of programming voltage pulses to the control gate (CG) via a corresponding wordline (WL). Each programming voltage pulse would induce an electric field that would pull the electrons onto the charge storage node. After each programming pulse is applied to the selected wordline, a verify operation can be performed by reading the memory cell in order to determine whether the threshold voltage $V_T$ of the memory cell has reached a desired value (voltage verify level). If the threshold voltage $V_T$ of the memory cell has reached the verify voltage associated with the desired state, the bitline to which the memory cell is connected can be biased at the program inhibit voltage, thus inhibiting the memory cells that are coupled to the bitline from being further programmed, i.e., to prevent the threshold voltage $V_T$ of the memory cells from shifting further upward in response to subsequent programming pulses applied to the selected wordline.

Figure 5A:
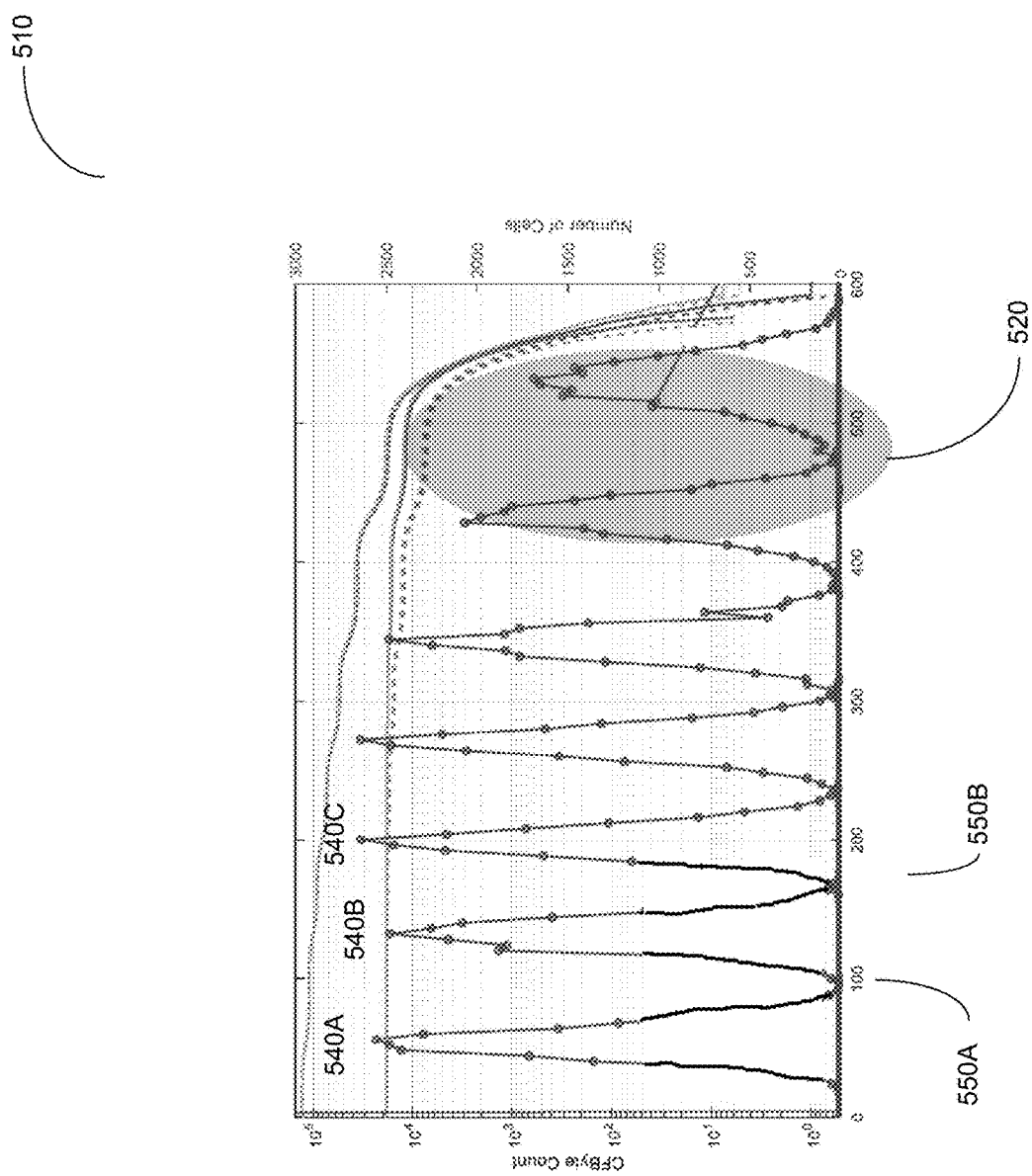
FIGS. 5A-5B schematically illustrates example threshold voltage distributions and corresponding device-originated metadata values in a triple-level cell (TLC) memory page, in accordance with aspects of the present disclosure.
Figure 5B:
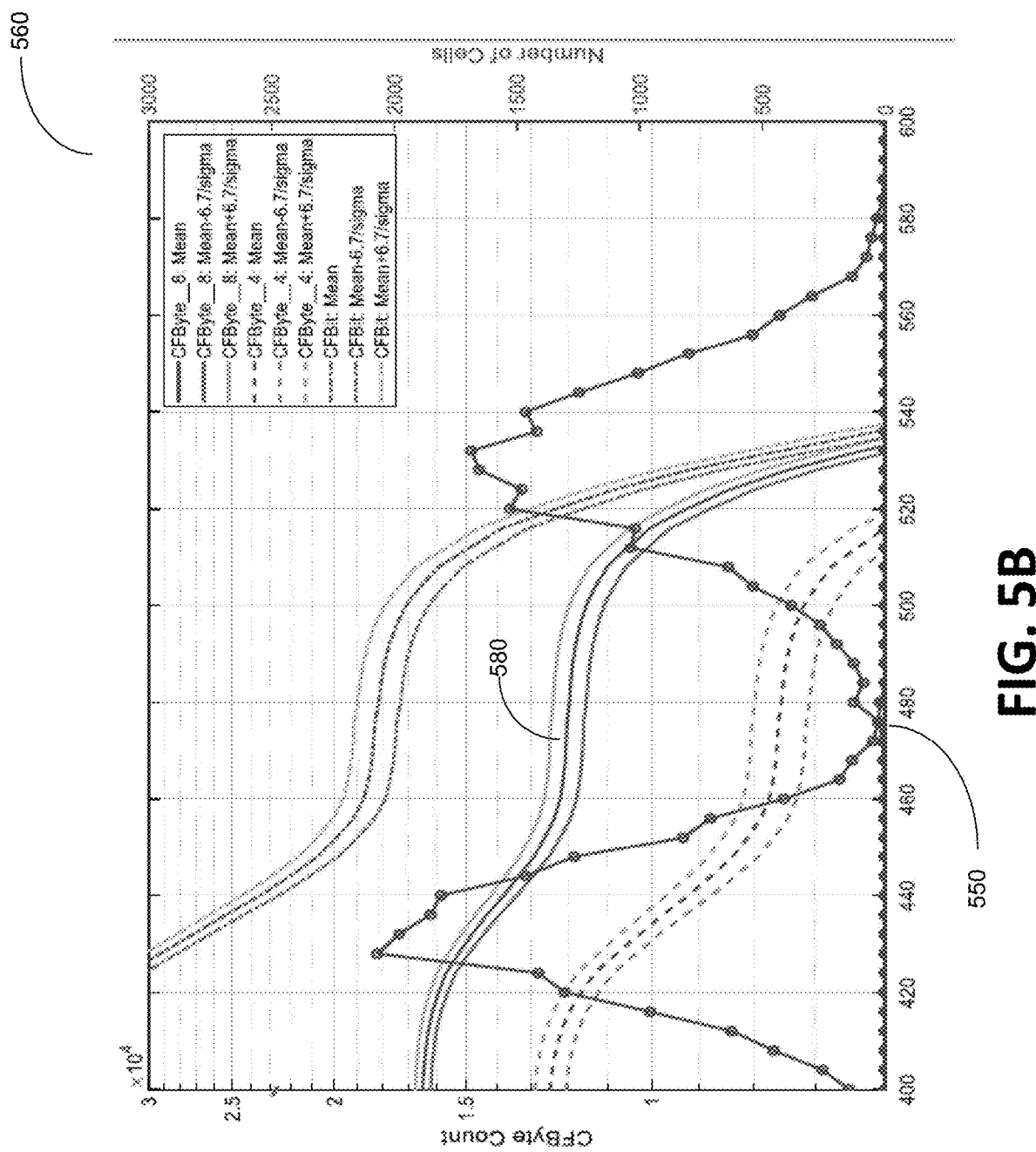

As noted herein above, the systems and methods of the present disclosure utilize certain memory device-originated metadata (e.g., failed bit counts and/or failed byte counts) for adjusting the read voltage levels. FIGS. 5A-5B schematically illustrate threshold voltage distributions of a set of memory cells and corresponding metadata values (the failed byte count (CFByte) and the failed bit count (CFBit)).

Each memory cell can be programmed into one or several (e.g., eight) charge states that differ by the amount of charge stored by the cell. FIG. 5A shows example distributions 540A-540C of threshold voltages $P(V_T, Q_k)$ for different TLC charge states, which are separated by respective valley margins 550A-550B. The charge state $Q_k$ of a given memory cell can be determined by a read operation by detecting that a control gate voltage $V_{CG}$ within the valley margin $VM_k$ is sufficient to open the cell to the source-drain current whereas a control gate voltage within the preceding valley margin $VM_{k-1}$ is not. Accordingly, for a given read operation, the memory sub-system controller 115 can sequentially perform two or more read strobes at the read voltage levels that correspond to the presumed positions of one or more valley margins 550.

As noted herein above, the memory device 130 can be configured to return, in response to a read strobe, one or more metadata values to the memory access manager 134. In an illustrative example, the memory device may, upon performing a read strobe, return the failed byte count (CFByte). The failed byte count reflects (i.e., is equal to or is derived by a known transformation from) the number of bytes in the sensed data that have at least one non-conducting bitline. In another illustrative example, the memory device may, upon performing a read strobe, return the failed bit count (CFBit). The failed bit count reflects (i.e., is equal to or is derived by a known transformation from) the number of non-conducting bitlines in the sensed data. In various illustrative examples, the memory device can inspect at least a part of a memory page (e.g., four or eight bitlines) when counting non-conducting bitlines.

A non-conductive bitline identifies a subset of memory cells having their respective threshold voltages above the applied read voltage level. Accordingly, the ratio of the number of cells that have their respective threshold voltages above the applied read voltage level to the total number of cells may be indicative of the position of the applied read voltage level to the bottom of the voltage distribution valley.

Assuming that the data stored on the memory device is perfectly randomized, 1/n of the memory cells would be find within each logical programming level, where n is the number of logical programming levels supported by the memory cells (e.g., eight logical programming levels are supported by TLC cells). Accordingly, if the applied read voltage level is perfectly calibrated for the highest valley (e.g., the valley dividing L6 and L7 of TLC voltage distributions), then 1/n of the cells would be expected to have their respective threshold voltages above the applied read voltage level and thus 1/n of the bitlines would be expected to be non-conducting.

In an illustrative example of FIG. 5A, plot 510 schematically illustrates the dependency between the failed byte count (CFByte), the failed bit count (CFBit) and threshold voltage distributions of a set of memory cells, while plot 560 of FIG. 5B shows the detailed view of the area of interest 520 of plot 510. As can be seen from the plots 510 and 560, certain read voltage levels applied to the set of memory cells would result in corresponding the failed byte count (CFByte) and/or the failed bit count (CFBit) values.

Thus, the failed byte count (reflecting the number of bytes in the sensed data that have at least one non-conducting bitline) and the failed bit count (reflecting the number of non-conducting bitlines in the sensed data) returned by the memory device in response to a read strobe utilizing a known read voltage level can be indicative of the position of the utilized read voltage level with respect to the desired voltage distribution valley. In particular, if applied the read voltage level is higher than the desired voltage distribution valley, the failed byte count and the failed bit count will be below the expected value, and vice versa.

As noted herein above, various read calibration techniques can be effectively "blind" with respect to the voltage distribution, which means that the threshold voltage estimate produced by such calibration techniques could gradually drift into the wrong voltage distribution valley, thus making the read data uncorrectable. Conversely, the memory device-originated failed bit count can be utilized for effectively detect wrong valley calibration instances.

In particular, the failed byte count for the highest valley can be effectively used for coarse calibration. As schematically illustrated by FIG. 5B, the failed byte count stays relatively flat (constant) within a vicinity of the valley while decreasing towards each of the neighboring peaks. Accordingly, a coarse calibration can involve performing several read strobes with varying read voltage levels and estimating the interval in which the failed byte count stays relatively flat, which would match the position of the target valley.

However, while the failed byte count may be strongly correlated with the charge loss for the higher logical programming levels, it can lose the resolution towards the lower programming levels, since the presence of any non-conductive bitlines in the sensed data increments the failed byte count irrespectively of the number of non-conductive bitlines). While the amount of the charge loss seen in the highest logical programing levels may be considered as a suitable proxy for the charge loss on other levels, more fine-tuned calibration results may be obtained by using the failed bit count on at least a subset of the logical programming levels.

In particular, for a given target valley, a corresponding failed bit count can be estimated (e.g., based on the assumptions of equal width of voltage distributions of all logical programming levels and perfectly randomized date) as k/n, where n is the total number of logical programming levels supported by the memory cells and k is the number of the target valley. The failed bit count exceeding the estimated expected value would indicate that the calibrated read voltage level has drifted towards the lower valley with respect to the target valley. Conversely, the failed bit count falling below the estimated expected value would indicate that the calibrated read voltage level has drifted towards the higher valley with respect to the target valley. The difference between the estimated target failed bit count and the actual failed bit count can be translated into the voltage adjustment value, as described in more detail herein below.

Figure 6:
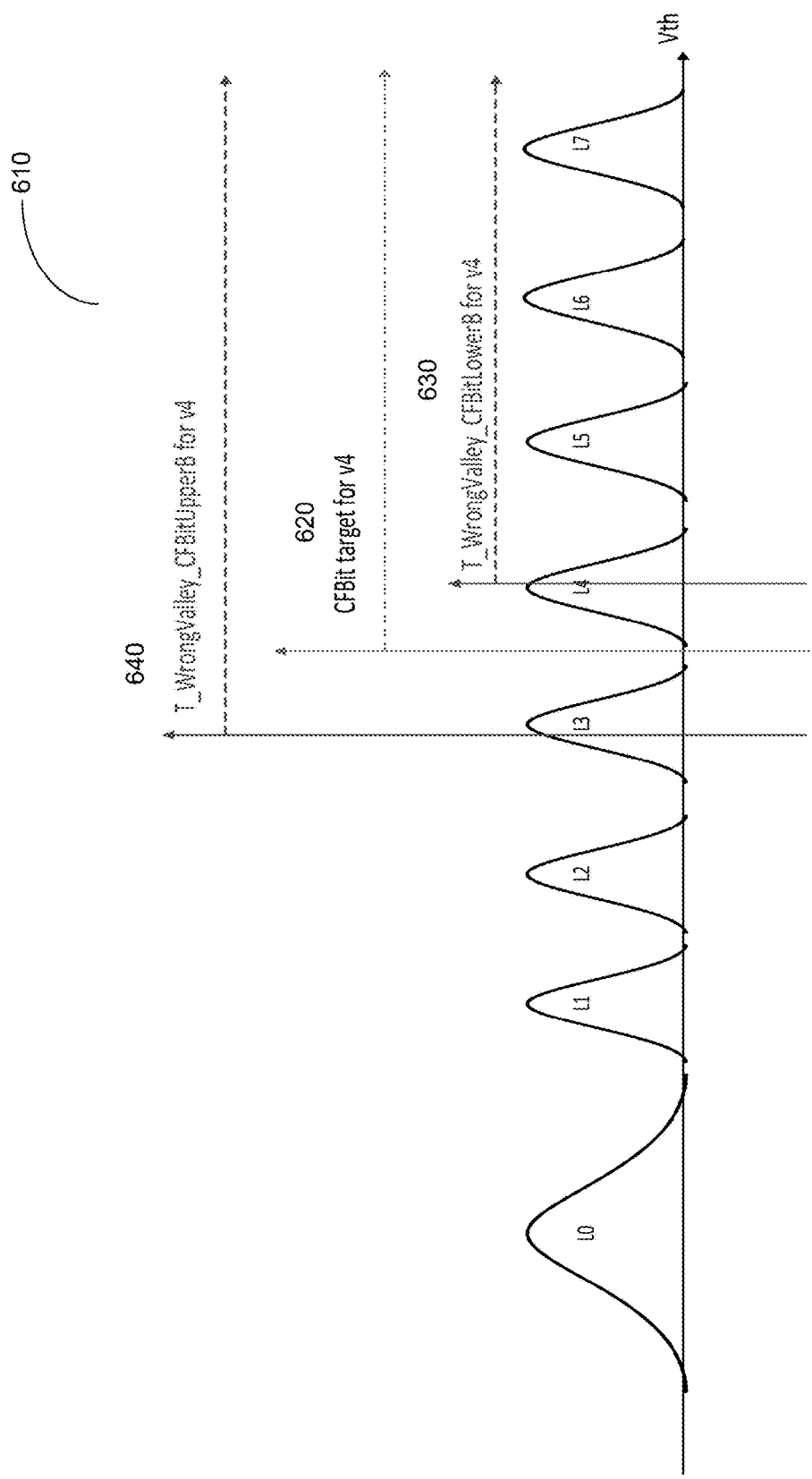
FIG. 6 schematically illustrates the dependency between the failed bit count (CFBit) and threshold voltage distributions of a set of memory cells, in accordance with aspects of the present disclosure.

As schematically illustrated by FIG. 6, in which plot 610 schematically illustrates the dependency between the failed bit count (CFBit) and threshold voltage distributions of a set of memory cells, the CFBit target value 620 for valley 4 (i.e., the valley separating L3 and L4 voltage distributions) is set at approximately 50% of all memory cells (since roughly equal numbers of the memory cells are expected to be below and above valley 4). Therefore, CFBit values exceeding the value 630 (roughly corresponding to the peak of L4 distribution) would indicate that the calibrated read voltage level has drifted to valley 5 (i.e., the valley separating L4 and L5 voltage distributions), which is the wrong valley with respect to the target valley 4. Conversely, CFBit values falling below the value 640 (roughly corresponding to the peak of L3 distribution) would indicate that the calibrated read voltage level has drifted to valley 3 (i.e., the valley separating L2 and L3 voltage distributions), which is also the wrong valley with respect to the target valley 4.

Thus, the metadata values, including the failed byte count and/or the failed bit count, received from the memory device 130 in response to a read strobe can be used by the memory sub-system controller 115 or a local media controller 135 ("the controller") in order to adjust the applied read levels in order to compensate for the voltage distribution shift. In an illustrative example, the controller can evaluate a chosen data state metric (e.g., RBER or BEC) on the sensed data in order to determine whether the sensed data can be successfully decoded or a threshold voltage adjustment and a subsequent new read strobe are needed. In the latter case, the controller can translate the received failed byte count and/or failed bit count values to the voltage level adjustments. The adjusted read level can then be utilized for performing subsequent read operations with respect to the wordline to which the initial read strobe has been applied and/or to one or more neighboring wordlines of that wordline. This sequence of calibration and read operations can be iteratively performed until either the sensed data is successfully decoded or a predefined maximum number of iterations have been performed.

In some implementations, the controller can utilize one or more returned metadata values to index a data structure (e.g., a lookup table) mapping memory device-originated metadata values (e.g., failed byte counts or failed bit counts) to the read voltage adjustment values. The data structure can be device type-specific, and can be pre-populated by analyzing memory device performance over at least a predefined number of program-erase cycles.

Alternatively, the controller can compute the read voltage adjustment value by applying a predefined mathematical transformation to the memory device-originated metadata values (e.g., failed byte counts or failed bit counts). In an illustrative example, the predefined transformation can be represented by a quadratic approximation on the differences of pairs of failed bit counts measured on consecutive strobes.

In some implementations, the controller can perform a read strobe and adjust the read voltage level based on the failed byte count for the highest logical programming level. Should the next read level produce a value of a chosen data state metric (e.g., BEC or RBER) outside of a desired range, the controller can perform another read strobe and adjust the read voltage level based on the failed bit count for at least a subset of logical programming levels. This sequence of calibration and read operations can be iteratively performed until either the sensed data is successfully decoded or a predefined maximum number of iterations have been performed, as described in more detail herein below.

Figure 7:
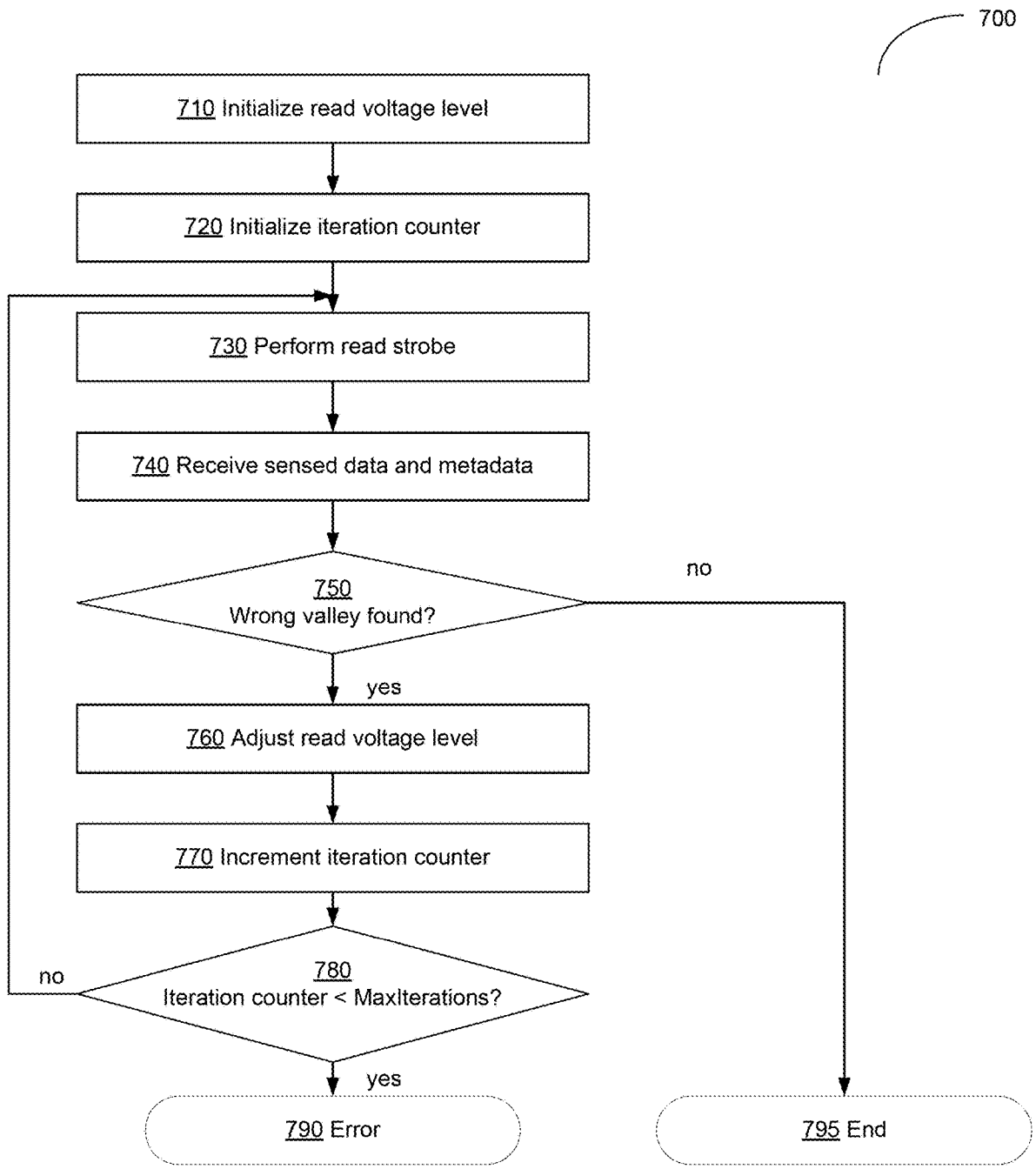
FIG. 7 is a flow diagram of an example method of calibrating read voltage level in memory devices, in accordance with embodiments of the present disclosure.

FIG. 7 is a flow diagram of an example method of calibrating read voltage level in memory devices, in accordance with embodiments of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some implementations, the method 700 is performed by the memory sub-system controller 115 and/or the local media controller 135 of FIG. 1.

In some implementations, the method 700 can be performed within a read command, in order to calibration prior to final sensing. In some implementations, the method 700 can be by the media controller, and read threshold adjustment can be performed prior to final sensing of data. Thus, a single read command can involve receiving the required metadata, applying the read voltage adjustment values, and sensing the memory array to provide sensed data to be transferred via the memory interface.

Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment.

At operation 710, the controller implementing the method initializes the read voltage level to be applied to a specified wordline of a memory device. In some implementations, the read voltage level may be produced by an error correction workflow. Alternatively, a default read voltage level may be used, which may be stored in the memory of the controller.

At operation 720, the controller initializes the iteration counter.

At operation 730, the controller causes a read strobe to be performed, which involves applying the chosen or adjusted read voltage level to the specified wordline of the memory device.

At operation 740, the controller receives the sensed data and the memory device-originated metadata reflecting the conductive state of one or more bitlines. The memory device-originated metadata can include, e.g., the failed byte count and/or failed bit count, as described in more detail herein above.

At operation 750, the controller determines whether the applied read voltage levels match the voltage distribution valleys corresponding all logical programing levels. In an illustrative example, the controller may check the failed bit count for each valley. Responsive to determining that the failed bit count for a particular valley is outside of a predefined range, the applied read voltage level is either misplaced within the valley or falls within a wrong valley. The lower margin of the predefined range may be set at a predefined percentage level below the expected failed bit count, which may be computed as described herein above; the upper margin of the predefined range may be set at a predefined percentage level above the expected failed bit count.

Responsive to determining, at operation 750, that the applied read voltage levels match the voltage distribution valleys corresponding all logical programing levels, the method, at operation 795, terminates. The controller may optionally use the last iteration's read voltage levels for performing additional calibration operations or accept the data sensed by the last iteration.

Otherwise, at operation 760, the controller, for each valley that is determined to be wrong, adjusts the read voltage level (e.g., by a predefined voltage offset level).

At operation 770, the controller increments the iteration counter.

Responsive to determining, at operation 780, that the iteration counter has not reached the predefined maximum number of iterations, the method loops back to operation 730; otherwise, the method, at operation 790, terminates with an error indicating that the calibration flow failed to correct the wrong valley within the set number of iterations. The controller may use the last iteration's read voltage levels or declare an unrecoverable error.

Figure 8:
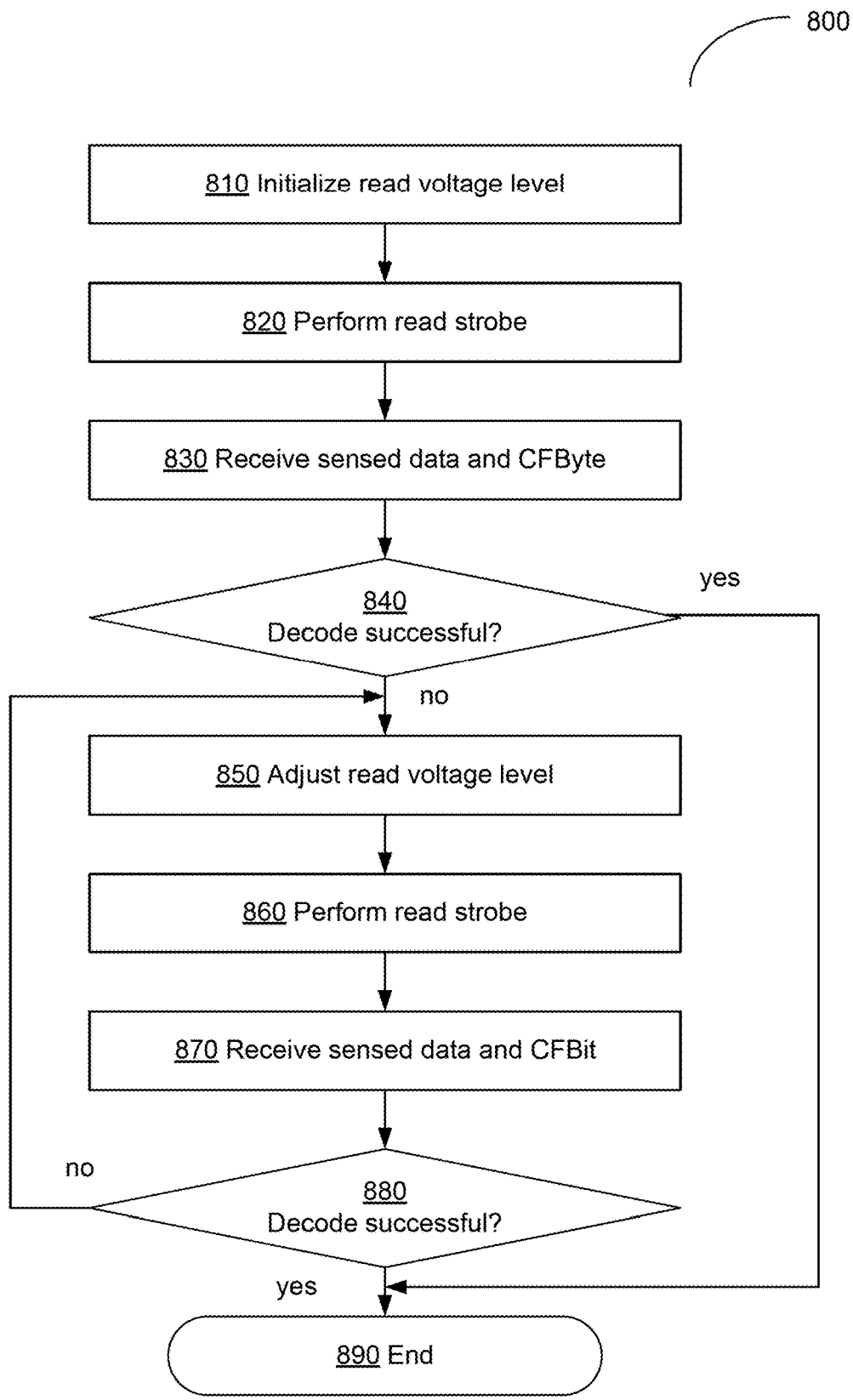
FIG. 8 is a flow diagram of another example method of calibrating read voltage level in memory devices, in accordance with embodiments of the present disclosure.

FIG. 8 is a flow diagram of another example method of calibrating read voltage level in memory devices, in accordance with embodiments of the present disclosure. The method 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some implementations, the method 800 is performed by the memory sub-system controller 115 and/or the local media controller 135 of FIG. 1.

In some implementations, the method 800 can be performed within a read command, in order to calibration prior to final sensing. In some implementations, the method 800 can be by the media controller, and read threshold adjustment can be performed prior to final sensing of data. Thus, a single read command can involve receiving the required metadata, applying the read voltage adjustment values, and sensing the memory array to provide sensed data to be transferred via the memory interface.

Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment.

At operation 810, the controller implementing the method initializes the read voltage to be applied to a specified wordline of a memory device. The default read voltage level may be device type-specific and may be stored in the memory of the controller.

At operation 820, the controller causes a read strobe to be performed, which involves applying the chosen or adjusted read voltage level to a specified wordline of the memory device.

At operation 830, the controller receives the sensed data and the memory device-originated metadata reflecting the conductive state of one or more bitlines. The memory device-originated metadata can include, e.g., the failed byte count, as described in more detail herein above.

Responsive to determining, at operation 840, that the sensed data is successfully decoded (e.g., based on a value of a chosen data state metric), the method terminates (operation 890).

Otherwise (i.e., responsive to failing, at operation 840, to successfully decode the sensed data), the controller, at operation 850, use the received memory device-originated metadata (e.g., the failed byte count) for determining read voltage adjustment values. In some implementations, the controller can utilize one or more returned metadata values to index a data structure (e.g., a lookup table) mapping memory device-originated metadata values (e.g., failed byte counts or failed bit counts) to the read voltage adjustment values. Alternatively, the controller can compute the read voltage adjustment value by applying a predefined mathematical transformation to the memory device-originated metadata values (e.g., failed byte counts or failed bit counts).

At operation 860, the controller causes a read strobe to be performed, which involves applying the chosen or adjusted read voltage level to a specified wordline of the memory device.

At operation 870, the controller receives the sensed data and the memory device-originated metadata reflecting the conductive state of one or more bitlines. The memory device-originated metadata can include, e.g., the failed bit count, as described in more detail herein above.

Responsive to determining, at operation 880, that the sensed data is successfully decoded (e.g., based on a value of a chosen data state metric), the method terminates (operation 890); otherwise, the method loops back to operation 850.

Figure 9:
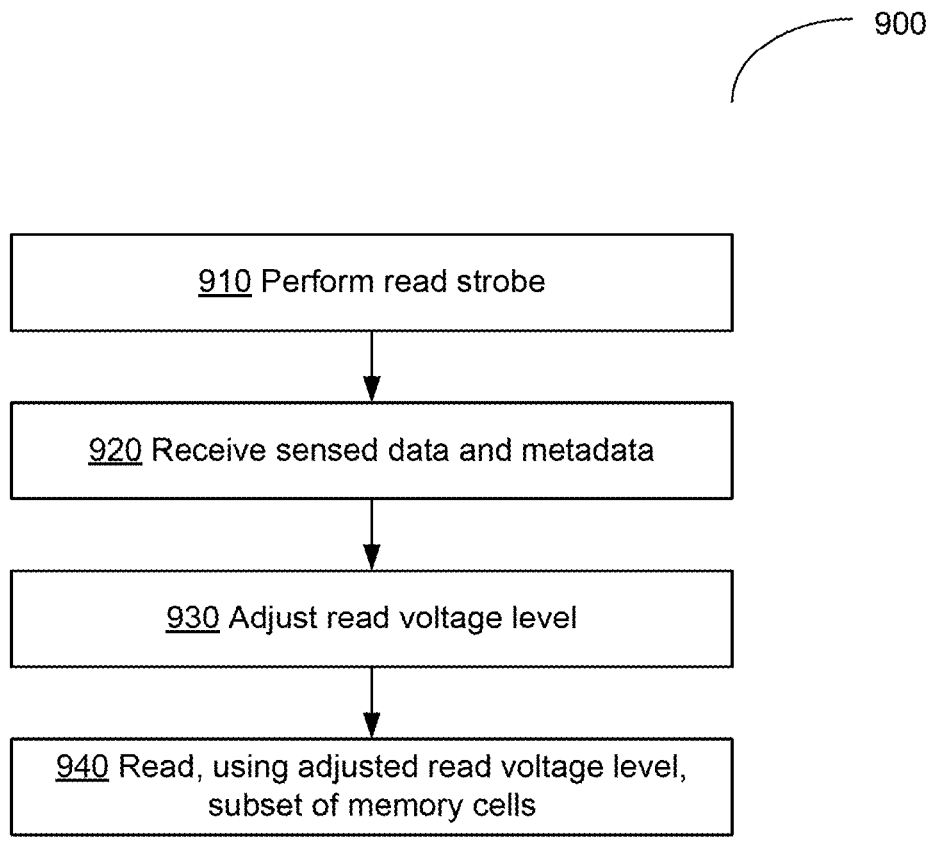
FIG. 9 is a flow diagram of another example method of calibrating read voltage level in memory devices, in accordance with embodiments of the present disclosure.

FIG. 9 is a flow diagram of another example method of calibrating read voltage level in memory devices, in accordance with embodiments of the present disclosure. The method 900 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some implementations, the method 900 is performed by the memory sub-system controller 115 and/or the local media controller 135 of FIG. 1.

In some implementations, the method 900 can be performed within a read command, in order to perform calibration prior to final sensing. In some implementations, the method 900 can be by the media controller, and read threshold adjustment can be performed prior to final sensing of data. Thus, a single read command can involve receiving the required metadata, applying the read voltage adjustment values, and sensing the memory array to provide sensed data to be transferred via the memory interface.

Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment.

At operation 910, the controller implementing the method the controller causes a read strobe to be performed, which involves applying the chosen or adjusted read voltage level to a specified subset of memory cells of the memory device. In some implementations, the subset of memory cells may be represented by at least a portion of a memory page.

At operation 920, the controller receives the sensed data and the memory device-originated metadata characterizing the read voltage level with respect to threshold voltage distributions of the subset of the plurality of memory cells. The metadata values reflect a conductive state of one or more bitlines connected to the subset of the plurality of memory cells. The memory device-originated metadata can include, e.g., the failed byte count and/or the failed bit count, as described in more detail herein above.

At operation 930, the controller determines, based on the one or more metadata values, a read voltage adjustment value. In some implementations, the controller can utilize one or more retrieved metadata values to index a data structure (e.g., a lookup table) mapping memory device-originated metadata values (e.g., failed byte counts or failed bit counts) to the read voltage adjustment values. Alternatively, the controller can compute the read voltage adjustment value by applying a predefined mathematical transformation to the memory device-originated metadata values (e.g., failed byte counts or failed bit counts), as described in more detail herein above.

At operation 940, the controller applies the read voltage adjustment value for reading the subset of memory cells, as described in more detail herein above.

Figure 10:
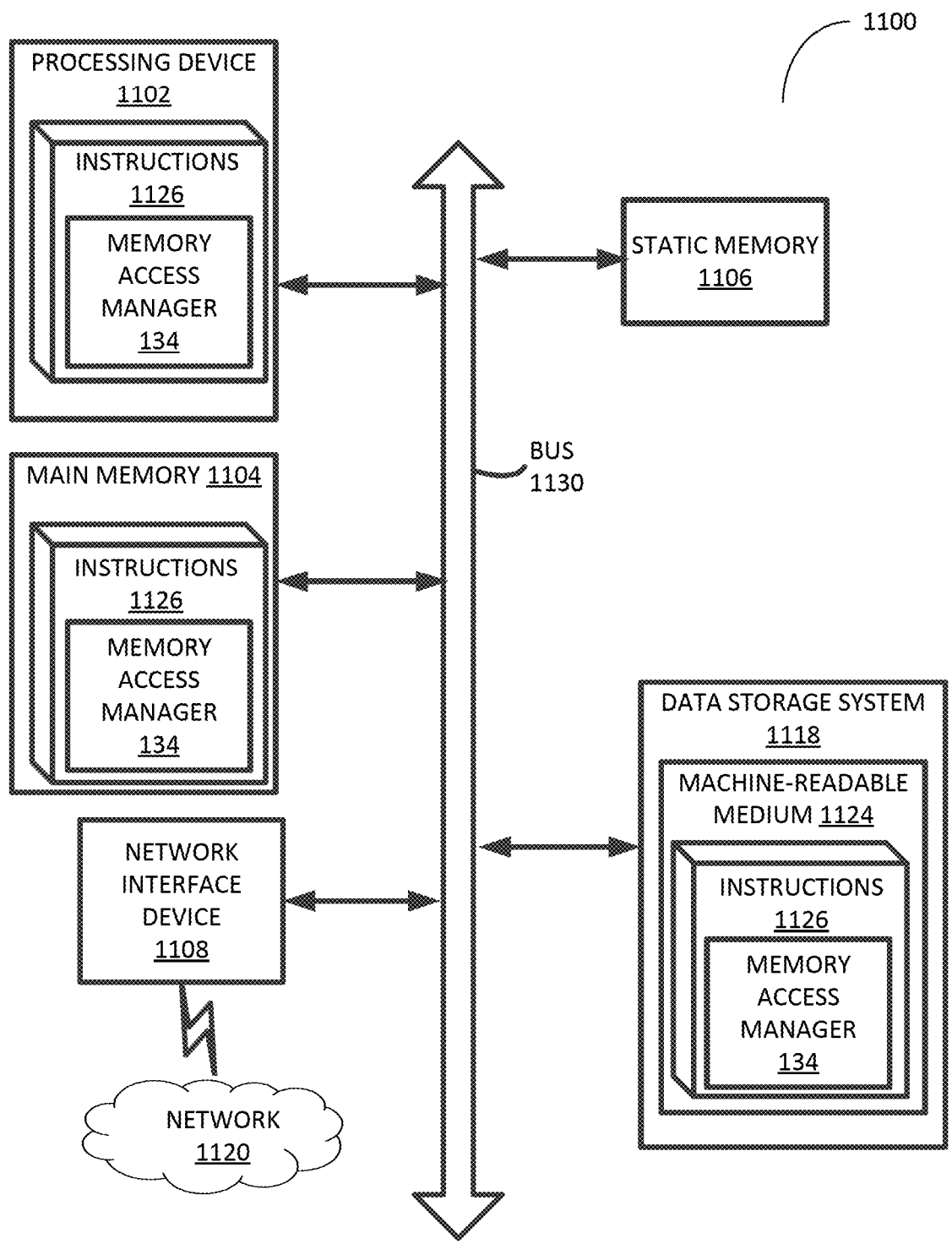
FIG. 10 is a block diagram of an example computer system in which embodiments of the present disclosure can operate.

FIG. 10 illustrates an example machine of a computer system 1100 within which a set of instructions, for causing the machine to perform any one or more of the methods discussed herein, can be executed. In some implementations, the computer system 1100 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to memory access manager 134 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methods discussed herein.

The example computer system 1100 includes a processing device 1102, a main memory 1104 (e.g., read-only memory (ROM), flash memory, dynamic random access memory (DRAM) such as synchronous DRAM (SDRAM) or Rambus DRAM (RDRAM), etc.), a static memory 1106 (e.g., flash memory, static random access memory (SRAM), etc.), and a data storage system 1118, which communicate with each other via a bus 1130.

Processing device 1102 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1102 can also be one or more special-purpose processing devices such as an application specific integrated circuit (ASIC), a field programmable gate array (FPGA), a digital signal processor (DSP), network processor, or the like. The processing device 1102 is configured to execute instructions 1126 for performing the operations and steps discussed herein. The computer system 1100 can further include a network interface device 1108 to communicate over the network 1120.

The data storage system 1118 can include a machine-readable storage medium 1 114 (also known as a computer-readable medium, such as a non-transitory computer-readable medium) on which is stored one or more sets of instructions 1126 or software embodying any one or more of the methods or functions described herein. The instructions 1126 can also reside, completely or at least partially, within the main memory 1104 and/or within the processing device 1102 during execution thereof by the computer system 1100, the main memory 1104 and the processing device 1102 also constituting machine-readable storage media. The machine-readable storage medium 1124, data storage system 1118, and/or main memory 1104 can correspond to the memory sub-system 110 of FIG. 1.

In one embodiment, the instructions 1126 include instructions to implement functionality corresponding to memory access manager 134 of FIG. 1). While the machine-readable storage medium 1124 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methods of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some implementations, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory sub-system, comprising:
    a memory device comprising a plurality of memory cells; and
    a controller coupled to the memory device, the controller to perform operations comprising:
        performing, using a read voltage level, a read strobe with respect to a subset of the plurality of memory cells;
        receiving, from the memory device, one or more metadata values characterizing the read voltage level with respect to threshold voltage distributions of the subset of the plurality of memory cells, wherein the one or more metadata values reflect a conductive state of one or more bitlines connected to the subset of the plurality of memory cells; and
        determining, based on the one or more metadata values, whether the read voltage level fails to match a voltage distribution valley corresponding to a specified logical programming level.

2. The memory device of claim 1, wherein the operations further comprise:
    determining, based on the one or more metadata values, a read voltage adjustment value; and
    applying the read voltage adjustment value for reading the subset of the plurality of memory cells.

3. The memory device of claim 2, wherein determining the read voltage adjustment value further comprises:
    applying a predefined mathematical transformation to the one or more metadata values.

4. The memory device of claim 1, wherein the one or more metadata values comprise a failed byte count for the specified logical programming level.

5. The memory device of claim 1, wherein the one or more metadata values comprise a failed bit count for one or more specified logical programming levels.

6. The memory device of claim 1, wherein the subset of the plurality of memory cells is at least a portion of a memory page.

7. A computer-readable non-transitory storage medium comprising executable instructions that, when executed by a controller managing a memory device comprising a plurality of memory cells, cause the controller to:
    perform, using a read voltage level, a read strobe with respect to a subset of the plurality of memory cells;
    receive, from the memory device, one or more metadata values characterizing the read voltage level with respect to threshold voltage distributions of the subset of the plurality of memory cells, wherein the one or more metadata values reflect a conductive state of one or more bitlines connected to the subset of the plurality of memory cells; and
    determine, based on the one or more metadata values, whether the read voltage level fails to match a voltage distribution valley corresponding to a specified logical programming level.

8. The computer-readable non-transitory storage medium of claim 7, further comprising executable instructions that, when executed by the controller, cause the controller to:
    determining, based on the one or more metadata values, a read voltage adjustment value; and
    applying the read voltage adjustment value for reading the subset of the plurality of memory cells.

9. The computer-readable non-transitory storage medium of claim 7, wherein the one or more metadata values comprise a failed byte count for the specified logical programming level.

10. The computer-readable non-transitory storage medium of claim 7, wherein the one or more metadata values comprise a failed bit count for one or more specified logical programming levels.

11. The computer-readable non-transitory storage medium of claim 7, wherein the subset of the plurality of memory cells is at least a portion of a memory page.

12. A method, comprising:
performing, by a controller managing a memory device comprising a plurality of memory cells, using a read voltage level, a read strobe with respect to a subset of the plurality of memory cells;
receiving, from the memory device, one or more metadata values characterizing the read voltage level with respect to threshold voltage distributions of the subset of the plurality of memory cells, wherein the one or more metadata values reflect a conductive state of one or more bitlines connected to the subset of the plurality of memory cells; and
determining, based on the one or more metadata values, whether the read voltage level fails to match a voltage distribution valley corresponding to a specified logical programming level.

13. The method of claim 12, further comprising:
determining, based on the one or more metadata values, a read voltage adjustment value; and
applying the read voltage adjustment value for reading the subset of the plurality of memory cells.

14. The method of claim 13, wherein determining the read voltage adjustment value further comprises:
applying a predefined mathematical transformation to the one or more metadata values.

15. The method of claim 12, wherein the one or more metadata values comprise a failed byte count for the specified logical programming level.

16. The method of claim 12, wherein the one or more metadata values comprise a failed bit count for one or more specified logical programming levels.

17. The method of claim 12, wherein the subset of the plurality of memory cells is at least a portion of a memory page.

* * * * *